(12) United States Patent
Vasudev et al.

(10) Patent No.: US 10,509,546 B2
(45) Date of Patent: Dec. 17, 2019

(54) HISTORY COMPONENT FOR SINGLE PAGE APPLICATION

(71) Applicant: salesforce.com, inc., San Francisco, CA (US)

(72) Inventors: Gautam Vasudev, San Francisco, CA (US); Avaneesh Desai, San Francisco, CA (US); Megha Tiwari, San Francisco, CA (US); Maxwell Lu, San Francisco, CA (US); Ji Wang, Fremont, CA (US); Nicolas Kruk, Durham, NC (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/693,355

(22) Filed: Aug. 31, 2017

(65) Prior Publication Data

US 2019/0065016 A1    Feb. 28, 2019

(51) Int. Cl.
  *G06F 3/048* (2013.01)
  *G06F 3/0483* (2013.01)
  *G06F 3/0482* (2013.01)
  *G06F 16/25* (2019.01)
  *G06F 16/23* (2019.01)

(52) U.S. Cl.
  CPC .......... *G06F 3/0483* (2013.01); *G06F 3/0482* (2013.01); *G06F 16/2379* (2019.01); *G06F 16/252* (2019.01)

(58) Field of Classification Search
  CPC ....... G06F 3/0483; G06F 3/0482; G06F 17/30
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — David E Choi
(74) *Attorney, Agent, or Firm* — Weaver Austin Villeneuve & Sampson LLP

(57) ABSTRACT

Disclosed are some implementations of systems, apparatus, methods and computer program products for facilitating the presentation of a personalized user history component in a graphical user interface (GUI), where the history component identifies primary tabs and associated sub-tabs that have been recently accessed by the user. Upon selection of one of the primary tabs, information pertaining to data records associated with the selected primary tab is presented using a link that includes identifiers of the selected primary tab and associated sub-tabs. The link may be saved or shared, enabling the primary tab and associated sub-tabs to be accessed by the user or another user.

22 Claims, 10 Drawing Sheets

(56) References Cited

U.S. PATENT DOCUMENTS

| | | |
|---|---|---|
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B2 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0169832 A1* | 7/2010 | Chang .................. G06F 16/954 715/811 |
| 2011/0218958 A1 | 9/2011 | Warshavsky et al. |
| 2011/0247051 A1 | 10/2011 | Bulumulla et al. |
| 2011/0274258 A1 | 11/2011 | Casalaina et al. |
| 2011/0274261 A1 | 11/2011 | Casalaina et al. |
| 2012/0042218 A1 | 2/2012 | Cinarkaya et al. |
| 2012/0216124 A1* | 8/2012 | Martino .............. G06F 16/9562 715/739 |
| 2012/0233137 A1 | 9/2012 | Jakobson et al. |
| 2012/0290407 A1 | 11/2012 | Hubbard et al. |
| 2013/0173720 A1 | 7/2013 | Vasudev et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0346873 A1 | 12/2013 | Vasudev et al. |
| 2014/0201641 A1 | 7/2014 | Casalaina et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0026620 A1* | 1/2015 | Kwon .................. G06F 3/04845 715/770 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0205462 A1* | 7/2015 | Jitkoff .................. G06F 16/955 715/777 |
| 2016/0048281 A1 | 2/2016 | Vasudev et al. |
| 2016/0065522 A1 | 3/2016 | Vasudev et al. |
| 2017/0005881 A1 | 1/2017 | Casalaina et al. |
| 2017/0076295 A1 | 3/2017 | Vasudev et al. |
| 2017/0171318 A1* | 6/2017 | Levithan .................. H04L 67/14 |
| 2017/0329859 A1* | 11/2017 | Ploeg .................. G06F 16/9562 |
| 2018/0144744 A1 | 5/2018 | Badarinath et al. |
| 2019/0065016 A1* | 2/2019 | Vasudev ............... G06F 3/0483 |

\* cited by examiner

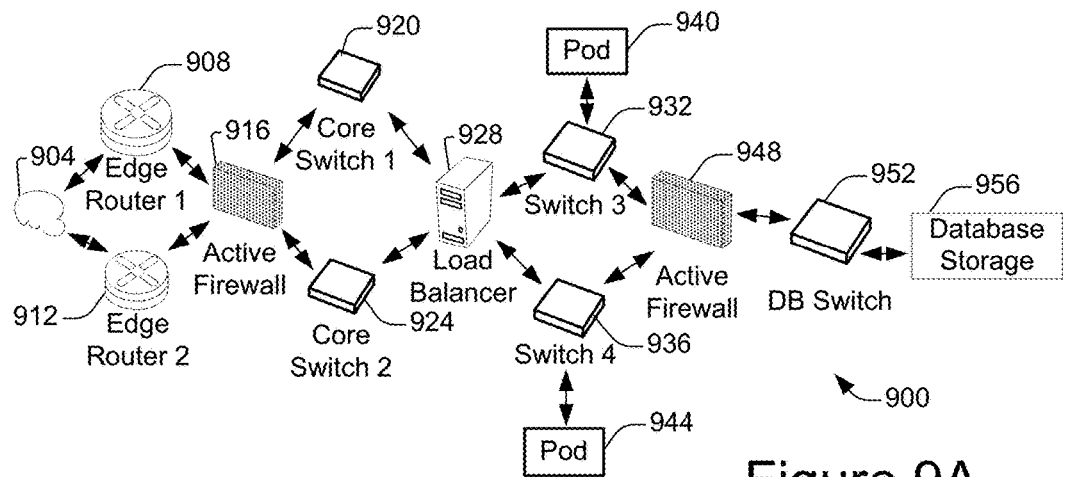
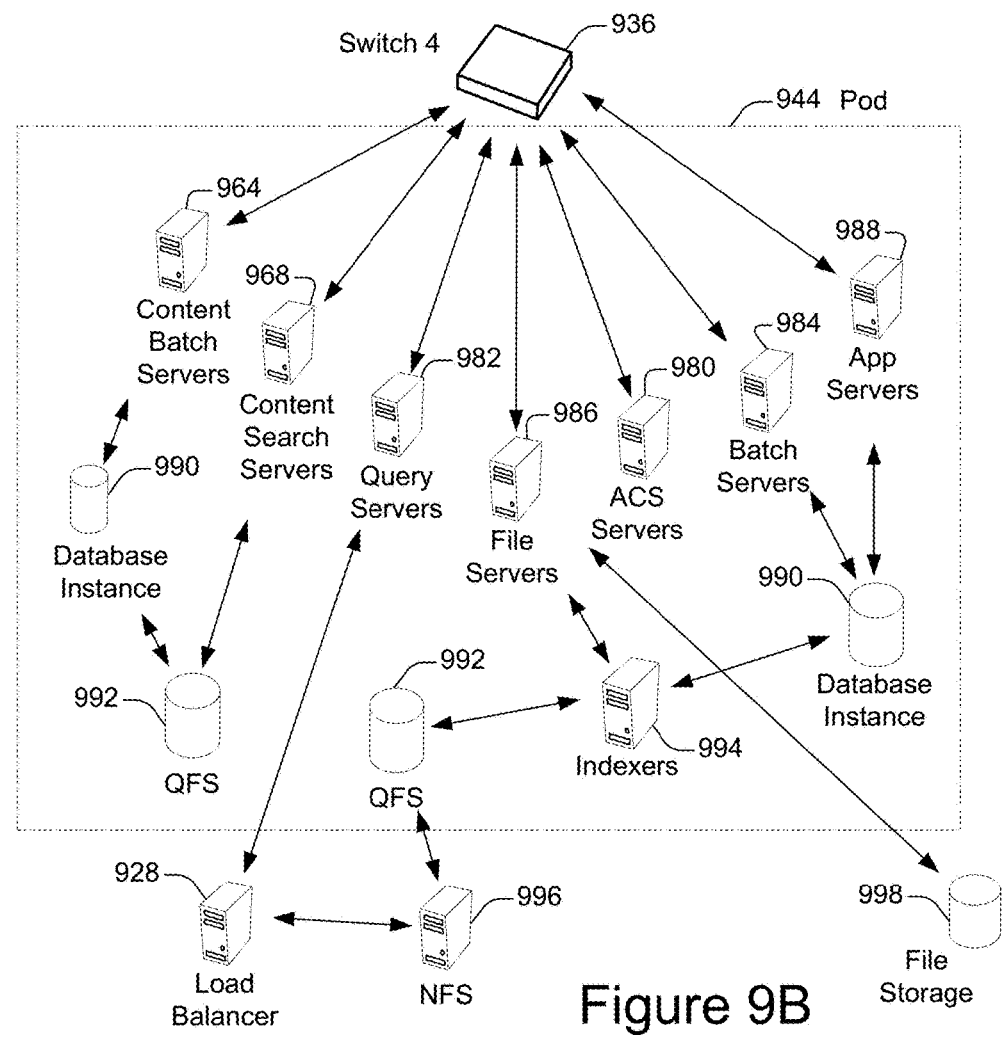

HISTORY COMPONENT FOR SINGLE PAGE APPLICATION

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with database systems, social networking systems, email systems, and instant messaging systems, by way of example, in a cloud computing environment.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

FIG. 9A shows a system diagram of an example of architectural components of an on-demand database service environment 900, in accordance with some implementations.

FIG. 9B shows a system diagram further illustrating an example of architectural components of an on-demand database service environment, in accordance with some implementations.

DETAILED DESCRIPTION

Figure 1:
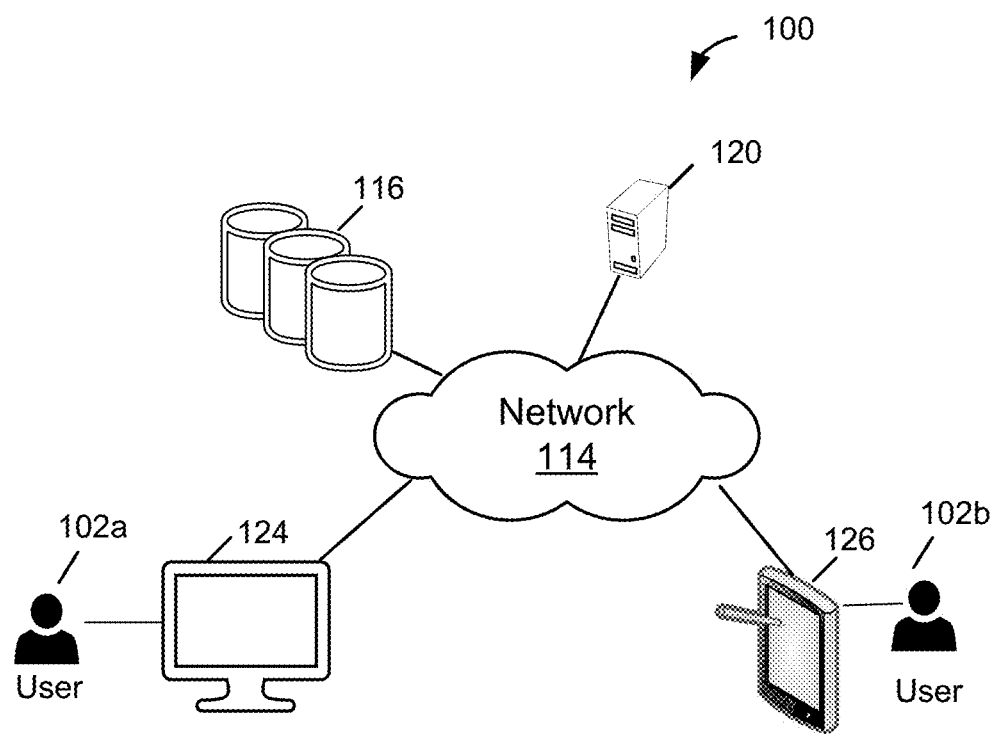
FIG. 1 shows a system diagram of an example of a server system 100 for providing a user interface including a history component, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Various implementations of the disclosed systems, apparatus, methods, and computer program products are configured for providing a history component within a graphical user interface (GUI). The history component is user-specific and may be maintained across multiple sessions, which may be established via different browsers or computing devices. In some implementations, the history component is specific to a particular application. For example, the history component may be maintained by an application such as Salesforce's Lightning Console application, which is configured to support access to organizational data.

In accordance with various implementations, an application maintains a history component that includes a history of data records that have recently been accessed by the user during execution of the application. Data records may be accessed by a user via the selection of tabs and sub-tabs presented within a GUI. In some implementations, the history component includes a hierarchical structure that identifies the tabs and sub-tabs that have been selected by the user during execution of the application. Example data records that may be accessed via tabs and sub-tabs include cases, accounts, opportunities, leads, contacts, and activities.

In some implementations, the user can save a link to a tab by copying the link to a virtual clipboard. In some implementations, the user may transmit the link to another user who has permission to access the organizational data via the application. The link may be generated to include a hierarchy that identifies the tab and associated sub-tabs. When a user receives the link, the user may click on the link to access the tab and any associated sub-tabs.

By way of illustration, John is a customer support employee at an organization, Pyramid Construction, Inc. John logs in to access a Console, which enables employees of the organization to access and update data records. John accesses a particular case record, Case 10000, by selecting a corresponding tab from a Graphical User Interface (GUI). Upon accessing the case record, John may access further information pertaining to the case via various sub-tabs. For example, the sub-tabs may correspond to contact(s) associated with the case. The system presents information pertaining to the case record associated with the tab using a link that includes a hierchical structure that identifies the tab and sub-tabs. As John clicks on tabs and sub-tabs presented within the GUI, a first history component is updated and presented via John's computing device. The first history component visually represents tabs and sub-tabs recently accessed by John. The first history component may be stored using a hierarchical data structure, and the first history component rendered via a display may similarly represent the tabs and sub-tabs via a hierarchical structure.

John decides to share the link with a co-worker, Jane. Jane receives the link and accesses the case by clicking on the link. Jane may then click on the sub-tabs to access information pertaining to the contacts associated with the case. As Jane clicks on the tab and sub-tabs, a second history component is updated and presented via Jane's computing device. The second history component visually represents tabs and sub-tabs recently accessed by Jane. The second history component may be stored using a hierarchical data structure, and may be rendered such that the tabs and sub-tabs recently accessed by Jane are visually represented by a corresponding hierarchical structure.

In some but not all implementations, the disclosed methods, apparatus, systems, and computer-readable storage media may be configured or designed for use in a multi-tenant database environment or system. The term "multi-tenant database system" can refer to those systems in which various elements of hardware and software of a database system may be shared by one or more customers. For example, a given application server may simultaneously process requests for a great number of customers, and a given database table may store rows of data corresponding to data records for a potentially much greater number of customers.

FIG. 1 shows a system diagram of an example of a server system 100 for providing a user interface including a history component, in accordance with some implementations. Server system 100 includes a variety of different hardware and/or software components that are in communication with each other. In the non-limiting example of FIG. 1 server system 100 includes at least one server 120, which is communicatively coupled to at least one content service database 116. Content service database 116 may be internal to server system 100 or external to server system 100. As shown in this example, server 120 may communicate with content service database 116 via a network 114. In accordance with various implementations, users 102*a*, 102*b* may access and/or update data records in content service database 116 via a GUI accessed via their respective client computing devices 124, 126. Updates to content service database 116 may include, for example, modifying data within a field of a data record, deleting a data record, or generating a new data record. Content service database 116 may include at least one relational database and/or at least one non-relational database.

Each non-relational database can allow for storage and retrieval of large sets of data. A non-relational database can be a database implemented in HBase or other non-relational database management system. This database can include one or more records for each of a plurality of enterprises (also referred to as organizations, or tenants.) In some implementations, the database can include one or more tables in which one or more enterprises have records. In some implementations, methods and applications are provided for the storage of data being captured in real-time.

Each relational database can allow for storage and retrieval of sets of data. In some implementations, a relational database can store and maintain records and data objects relating to cases, accounts, opportunities, leads, contacts, and/or activities. In some implementations, each relational database can be searched and queried in various ways by a user of system 100, providing for reports, graphs, data summaries, and other pieces of information.

Server 120 may communicate with other components of system 100. This communication may be facilitated through a combination of networks and interfaces. Server 120 may handle and process data requests from client computing devices 124, 126. Likewise, server 120 may return responses to client computing devices 124, 126 after corresponding data requests have been processed. For example, in response to a data request, server 120 may retrieve data from one or more databases. It may combine some or all of the data from different databases, and send the processed data to a requesting client computing device.

Users 102*a*, 102*b* can include different users corresponding to a variety of roles and/or permissions. Client systems 124, 126 may each be a computing device capable of communicating via one or more data networks with a server. Examples of client devices include a desktop computer or portable electronic device such as a smartphone, a tablet, a laptop, a wearable device such as Google Glass®, another optical head-mounted display (OHMD) device, a smart watch, etc. Each of client devices 124, 126 may include at least one browser in which applications may be deployed.

An authorization service may be used to determine who can access, update, generate, or publish content. APIs can be used to access, modify, generate, or publish content. In some implementations, access to content or APIs can be restricted to an appropriate set of users.

In some implementations, a user may have a single authorization identity. In other implementations, a user may have two or more different authorization identities. This can allow multiple modes of access to content.

Figure 2:
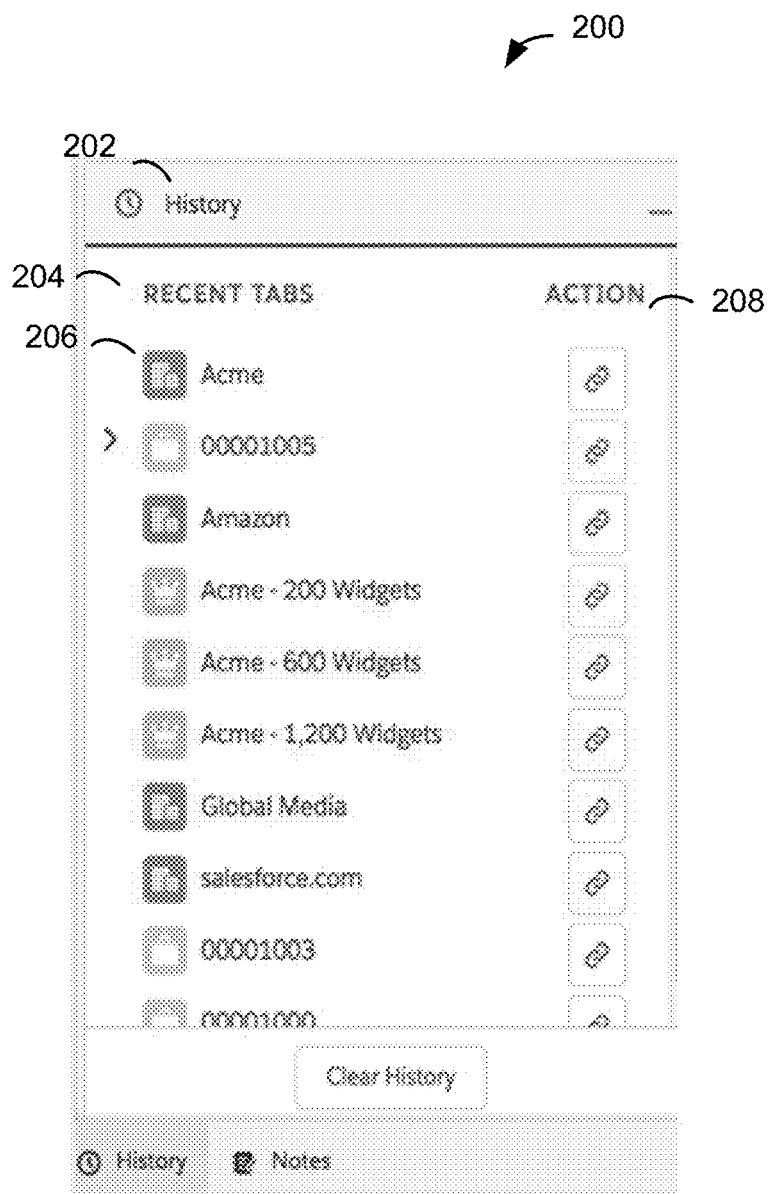
FIG. 2 shows an example of a user interface 200 in the form of a graphical user interface (GUI) presenting a history component, in accordance with some implementations.

FIG. 2 shows an example user interface 200 in the form of a graphical user interface (GUI) 200 presenting a history component, in accordance with some implementations. User interface 200 shows a history component 202, which identifies tabs 204 that have recently been accessed by the user. Tabs 204 may be presented in an order in which tabs 204 have been accessed (e.g., selected) by the user. In some implementations, tabs 204 are presented within history component 202 in a top-down order, where tabs at the top of the history component correspond to those that have most recently been accessed. In this example, Acme tab 206 is the tab that has most recently been accessed by the user.

In accordance with some implementations, history component 202 further indicates an action 208 that has been taken by the user in association with each tab 204. As shown in this example, action 208 may be indicated by an icon that represents the action performed by the user in association with the corresponding tab 204. Actions may include, but are not limited to, viewing a record corresponding to tab 204 and updating a record corresponding to tab 204. Therefore, history component 202 may indicate a tab most recently accessed by the user, as well as the action the user performed in relation to the tab.

Figure 3:
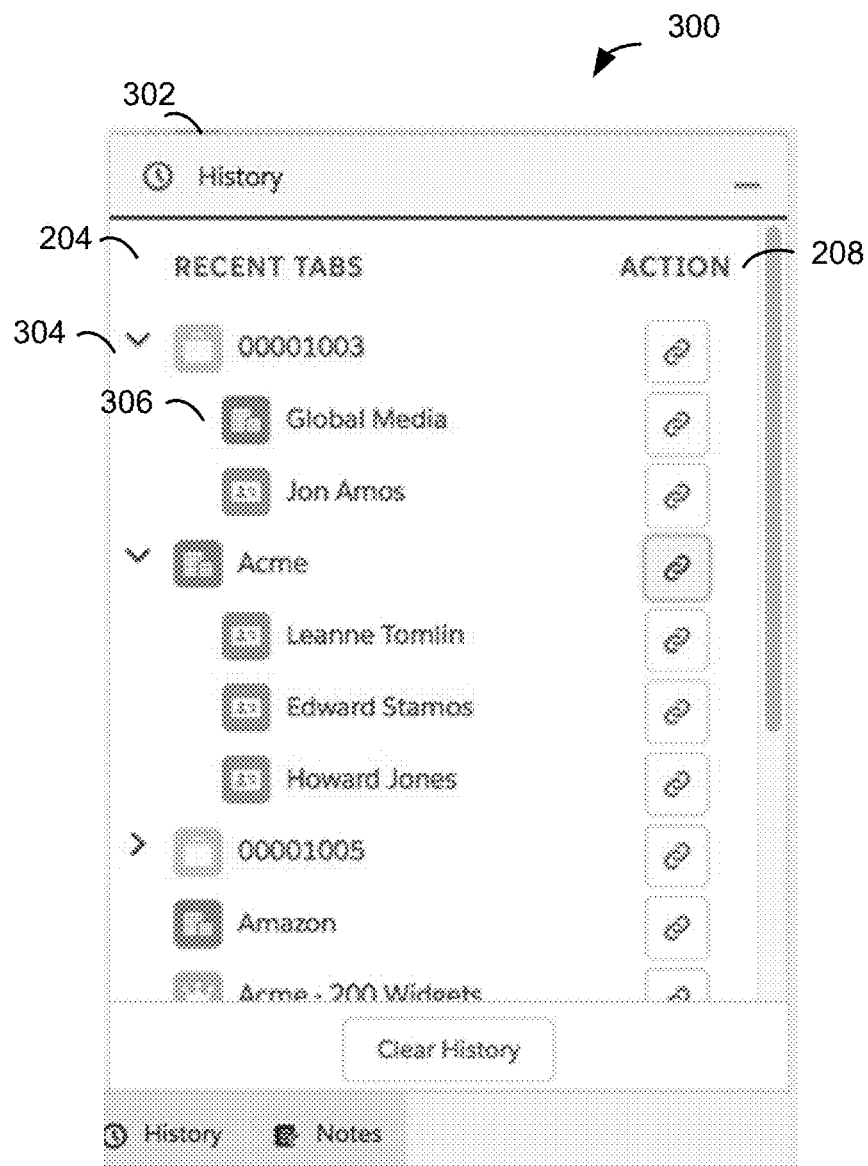
FIG. 3 shows an example of a user interface 300 in the form of a GUI presenting a history component having a hierarchical structure, in accordance with some implementations.

FIG. 3 shows an example user interface 300 in the form of a GUI presenting a history component having a hierarchical structure, in accordance with some implementations. In some implementations, history component 302 identifies primary tabs 304 that have recently been selected by the user, as well as sub-tabs 306 that have recently been selected by the user. After a primary tab is selected by the user, the primary tab is added to history component 302. In this example, primary tab 00001003 is the most recently selected primary tab. After the primary tab has been selected, the sub-tabs of primary tab that have recently been selected by the user may be added to history component 302. In this example, the user has selected sub-tabs Global Media and Jon Amos, which correspond to contacts pertaining to primary tab 00001003.

In some implementations, history component 302 presents tabs and sub-tabs via a hierarchical structure. In this example, sub-tabs 306 are indented from a corresponding primary tab 304 to visually distinguish sub-tabs 306 from primary tabs 304.

In some implementations, sub-tabs may be presented in an order that indicates the sub-tabs that have been most recently accessed by the user. In other implementations, sub-tabs may be presented in an order such as alphabetical, numerical, or alpha-numerical.

In accordance with various implementations, the user may return to a particular primary tab by clicking on the primary tab identifier within history component 302. The user may similarly return to a particular sub-tab by clicking on the sub-tab identifier within history component 302.

In some implementations, history component 302 presents a maximum number of tabs including primary tabs and/or sub-tabs. When a new tab is added to history component 302 and history component 302 already includes the maximum number of tabs, a least recently accessed tab or sub-tab may be removed from history component 302.

Figure 4:
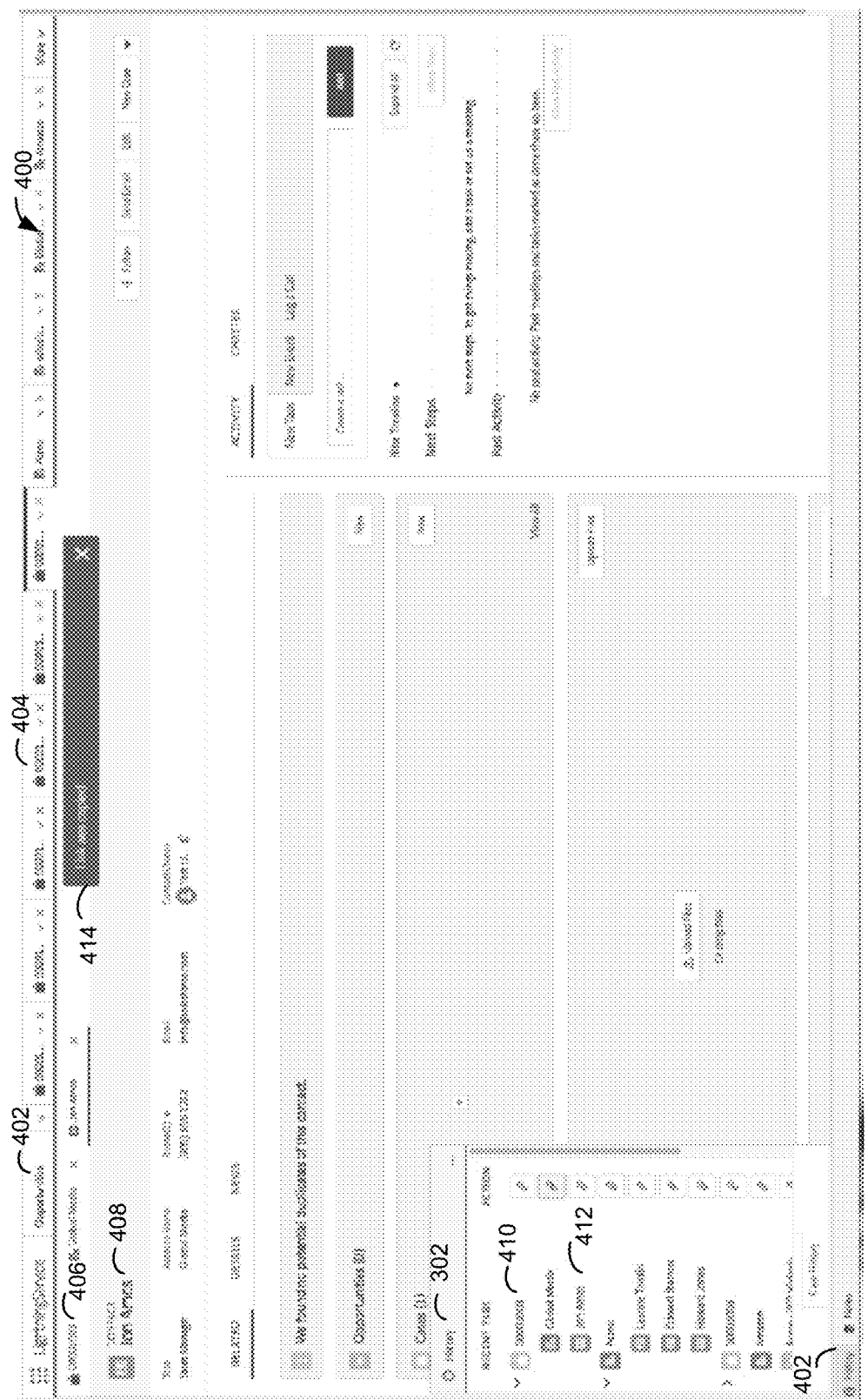
FIG. 4 shows an example user interface 400 in the form of a GUI supporting the copying of a link to a clipboard, in accordance with some implementations.

FIG. 4 shows an example user interface 400 in the form of a GUI supporting the copying of a link to a clipboard, in accordance with some implementations. User interface 400 is presented within the context of a Console that supports access to organizational data.

User interface 400 includes history component 302. In some implementations, user elects to view history component 302 by interacting with user interface object 402. In this example, the user has recently selected primary tab 404 corresponding to case 00001003. In response, the user is presented a record corresponding to case 00001003, as shown at 406. User then selects sub-tab 408 corresponding to contact, Jon Amos.

History component 302 is updated to include case 00001003 corresponding to primary tab 404, as shown at 410. In addition, history component 302 is updated to include sub-tab 408 corresponding to contact, Jon Amos, as shown at 412. History component 302 may be updated after or in response to the detection of a tab event such as a user selection of a tab/sub-tab or user closure of a tab/sub-tab.

In some implementations, a user may share a link to a primary tab. For example, the user may share a link by copying the link from an address bar of the browser. As another example, the user may share a link by selecting a share link option (not shown) from user interface 400. The user may choose to share the link via email, text message, or other medium. Alternatively, the user may choose to share the link by posting the link via a communication platform that is internal to the organization.

In addition, a user may copy a link and add the link to a virtual clipboard maintained by the application. The user may copy the link by directly copying the link from an address bar or by selecting a copy option (not shown) from user interface 400. Upon successfully copying the link, the user may be presented with a message confirming that the link was copied, as shown at 414.

Figure 5:
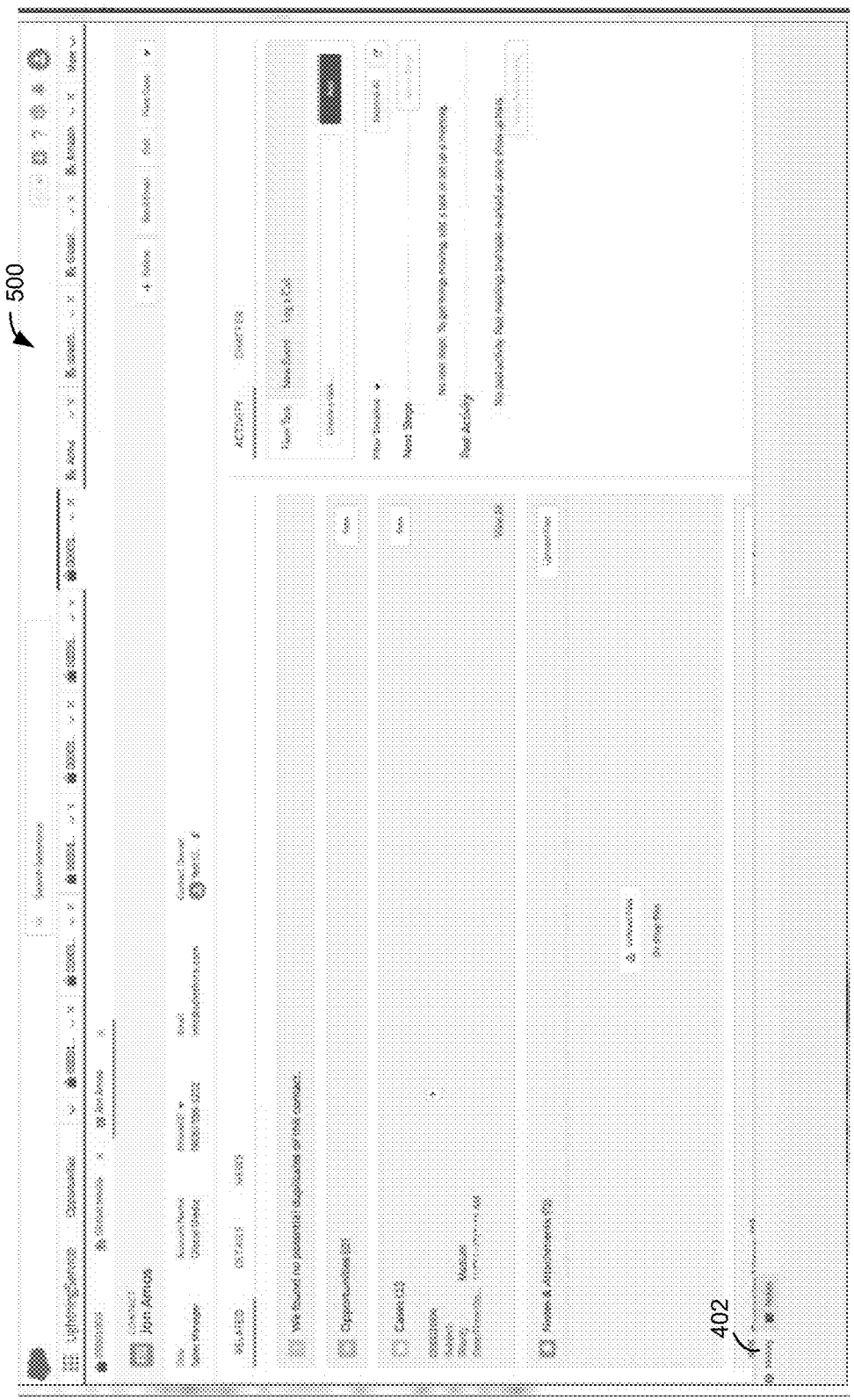
FIG. 5 shows an example user interface 500 in the form of a GUI presenting a minimized history component, in accordance with some implementations.

FIG. 5 shows an example user interface 500 in the form of a GUI presenting a minimized history component, in accordance with some implementations. In some implementations, the user may toggle user interface object 402 to minimize the history component, as shown in FIG. 5.

Figure 6:
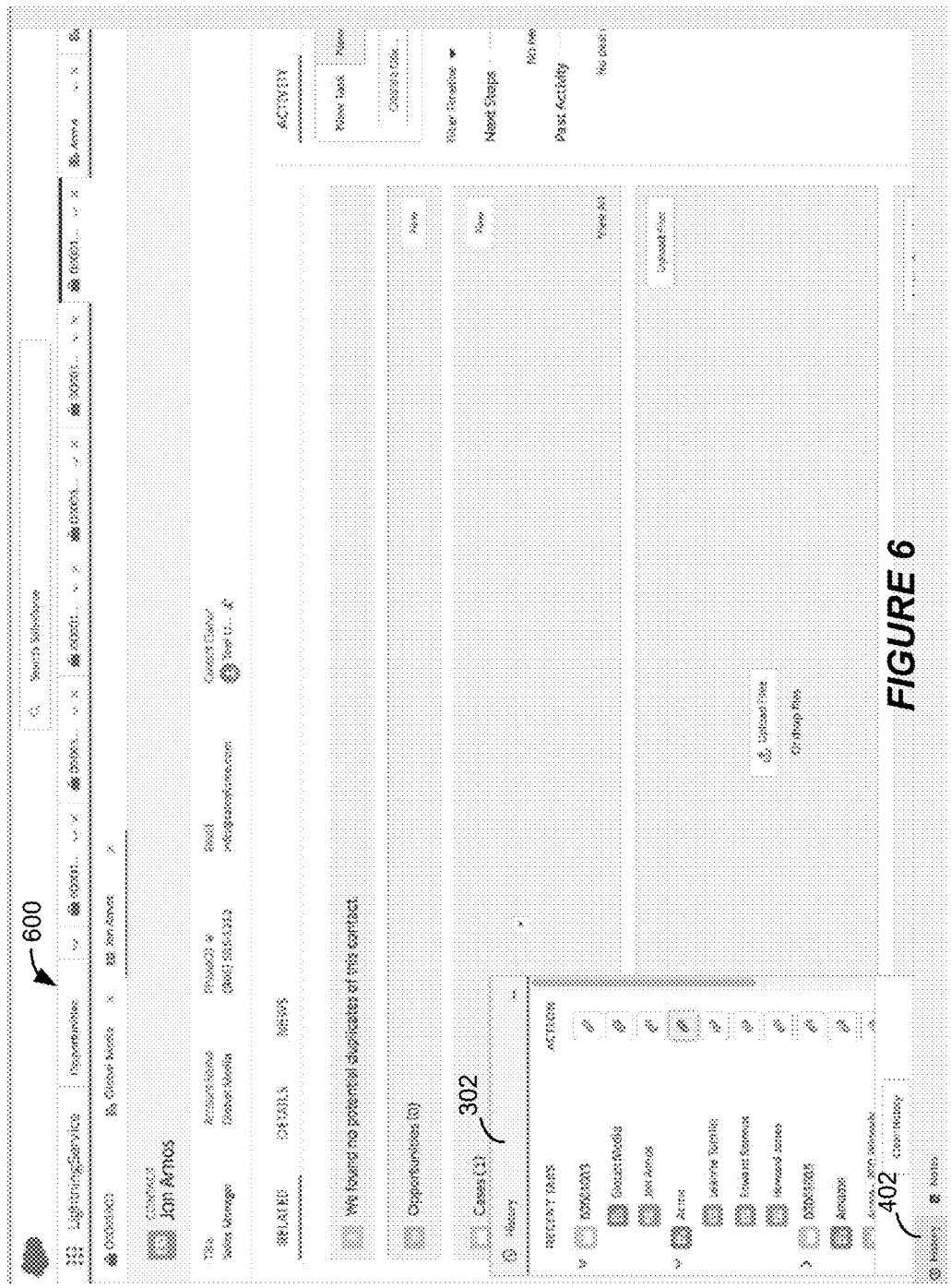
FIG. 6 shows an example user interface 600 in the form of a GUI presenting a history component within the context of a console, in accordance with some implementations.

FIG. 6 shows an example user interface 600 in the form of a GUI presenting a history component within the context of a console, in accordance with some implementations. To view the history component 302 that was minimized in user interface 500 of FIG. 5, the user may toggle user interface object 402, which causes the history component 302 to be presented within user interface 600.

Figure 7:
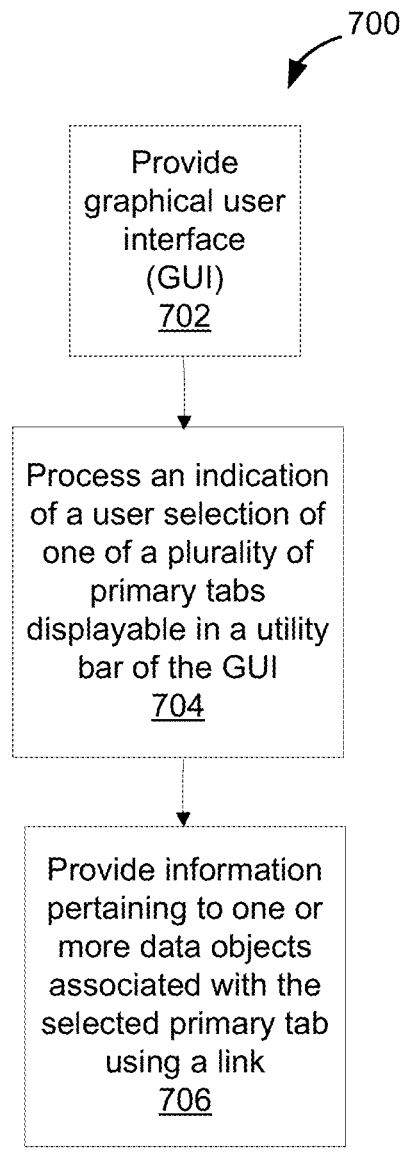
FIG. 7 shows an example of a method 700 for presenting a history component, in accordance with some implementations.

FIG. 7 shows an example of a method 700 for presenting a history component, in accordance with some implementations. A user of a client device logs into a web site to access an application. During execution of the application, a graphical user interface (GUI) is provided for display at a client device at 702. The GUI includes a history component associated with the user of the client device and with the application. In some implementations, the history component includes a hierarchical structure identifying a set of primary tabs recently accessed by the user during execution of the application and identifying a set of sub-tabs recently accessed by the user during execution of the application. Each sub-tab of the set of sub-tabs is identified within the hierarchical structure in association with a corresponding primary tab of the set of primary tabs. For example, an identifier of a sub-tab may be indented with respect to an identifier of a corresponding primary tab of the set of primary tabs. Each sub-tab of the set of sub-tabs may be associated with a corresponding set of data objects stored in at least one database. Similarly, each tab of the set of primary tabs may be associated with a corresponding set of data objects stored in at least one database.

In some implementations, a plurality of primary tabs are displayed in a utility bar of the GUI. An indication of a user selection of one of a plurality of primary tabs displayable in a utility bar of the GUI may be received and processed at 704.

Responsive to processing the indication of the user selection, information pertaining to one or more data objects associated with the selected primary tab may be provided using a link at 706, where the selected primary tab has one or more selectable sub-tabs associated therewith. In accordance with various implementations, the link includes an identifier of the selected primary tab and an identifier of each of the associated selectable sub-tabs of the selected primary tab. In addition, the link indicates a hierarchy of the selected primary tab and the associated selectable sub-tabs.

The link may be generated prior to providing the information or responsive to receiving the indication of the user selection (e.g., at the time that the information is provided). Information associating the link with the primary tab may be stored in at least one database.

In some implementations, the user may add a link corresponding to a selected primary tab to a clipboard in response to a user selection of the link. More particularly, an indication that the user has requested that the link be added to a virtual clipboard may be received. Responsive to receiving the indication that the user has requested that the link be added to a virtual clipboard, a virtual clipboard may be generated or updated to include the link. The virtual clipboard may be provided for display at the client device.

The history component of the GUI may be updated at 808 such that only a single instance of the selected primary tab is included in the set of primary tabs presented within the history component. In addition, the history component of the GUI may be updated such that an indicator of how recent the selected primary tab was accessed is provided. For example, the order in which the primary tabs are identified within the history component may correspond to the recency with which the primary tabs have been selected by the user.

In accordance with various implementations, the history component of the GUI may be updated responsive to the detection of a particular event. In some implementations, the event may include a tab event. Example tab events include, but are not limited to, closure of the primary tab, the user selection of the primary tab, closure of a sub-tab of the primary tab, or user selection of a sub-tab of the primary tab. In some implementations, which actions trigger an event can be configurable.

In some implementations, a listener module may listen to detect tab events during the execution of the application. Upon detecting a tab event, the tab event may be broadcasted to one or more components configured to update the GUI. Therefore, a tab event may trigger the performance of various operations.

The updating of the history component may include the "reorganization" of the tabs within the history component. For example, the recently selected primary tab may be added to the top of the list of tabs within the history component. In addition, a least recently selected primary tab may be removed from the history component, where the addition of a recently selected primary tab increases the total number of tabs or primary tabs within the history component beyond a maximum threshold.

Sub-tabs associated with a particular primary tab may be listed within the history component in a sequential order based, at least on part, on at least one of: recency of access by the user during execution of the application, numerical order, alphabetical order, or alphanumeric order. In some implementations, a maximum number of sub-tabs identified within the history component, in relation to a primary tab, may be configured.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

In accordance with various implementations, a history component may be maintained in association with a user profile. An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

A record can have a status, the update of which can be provided by an owner of the record or other users having suitable write access permissions to the record. The owner can be a single user, multiple users, or a group.

Updates to a record, also referred to herein as changes to the record, are one type of information update that can occur. Examples of record updates include field changes in the record, updates to the status of a record, as well as the creation of the record itself. Some records are publicly accessible, such that any user can follow the record, while other records are private, for which appropriate security clearance/permissions are a prerequisite to a user obtaining access to the record.

Information updates can include various types of updates, which may or may not be linked with a particular record. For example, information updates can be social media messages submitted by a user or can be otherwise generated in response to user actions or in response to events.

A "group" is generally a collection of users. In some implementations, the group may be defined as users with a same or similar attribute, or by membership.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
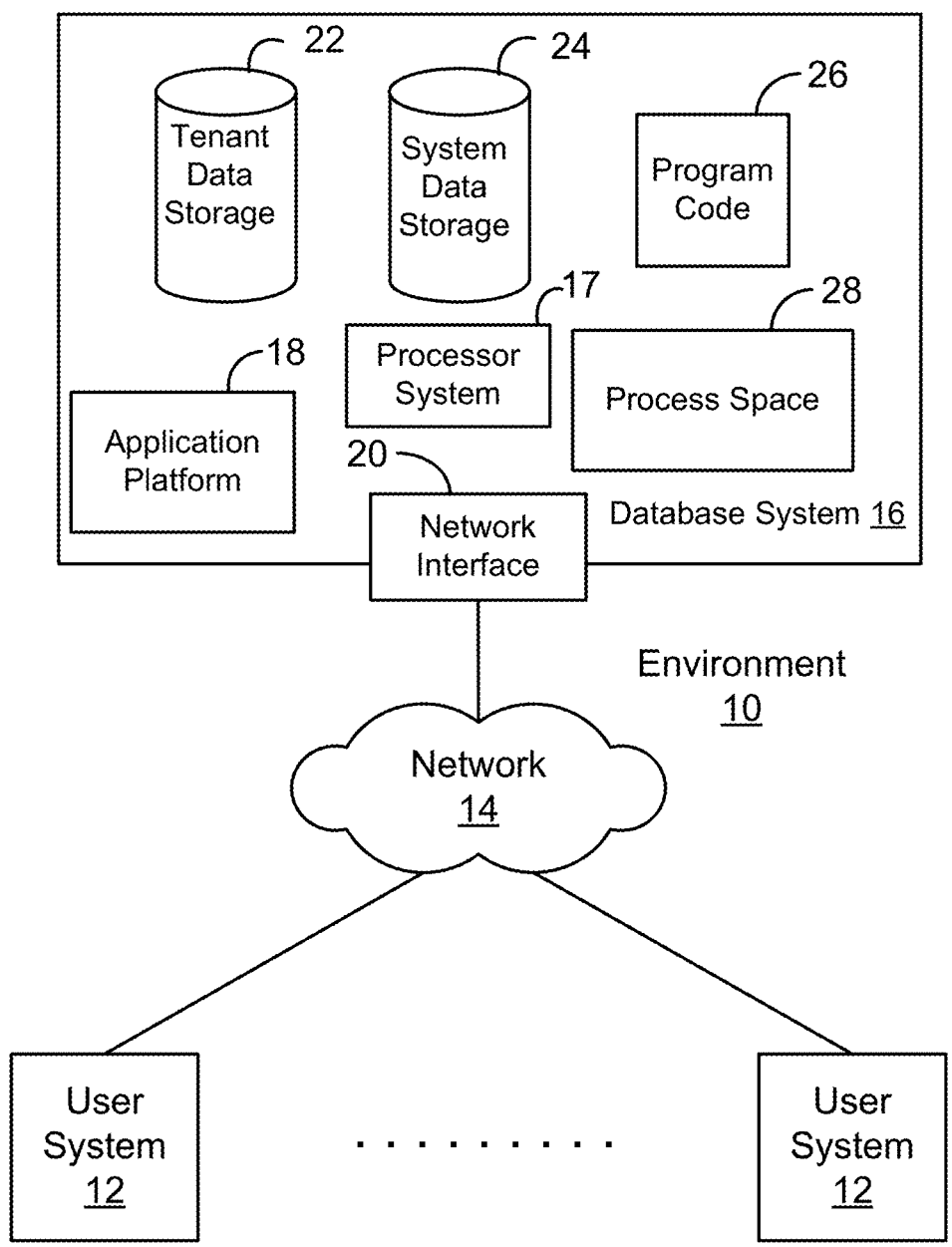
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
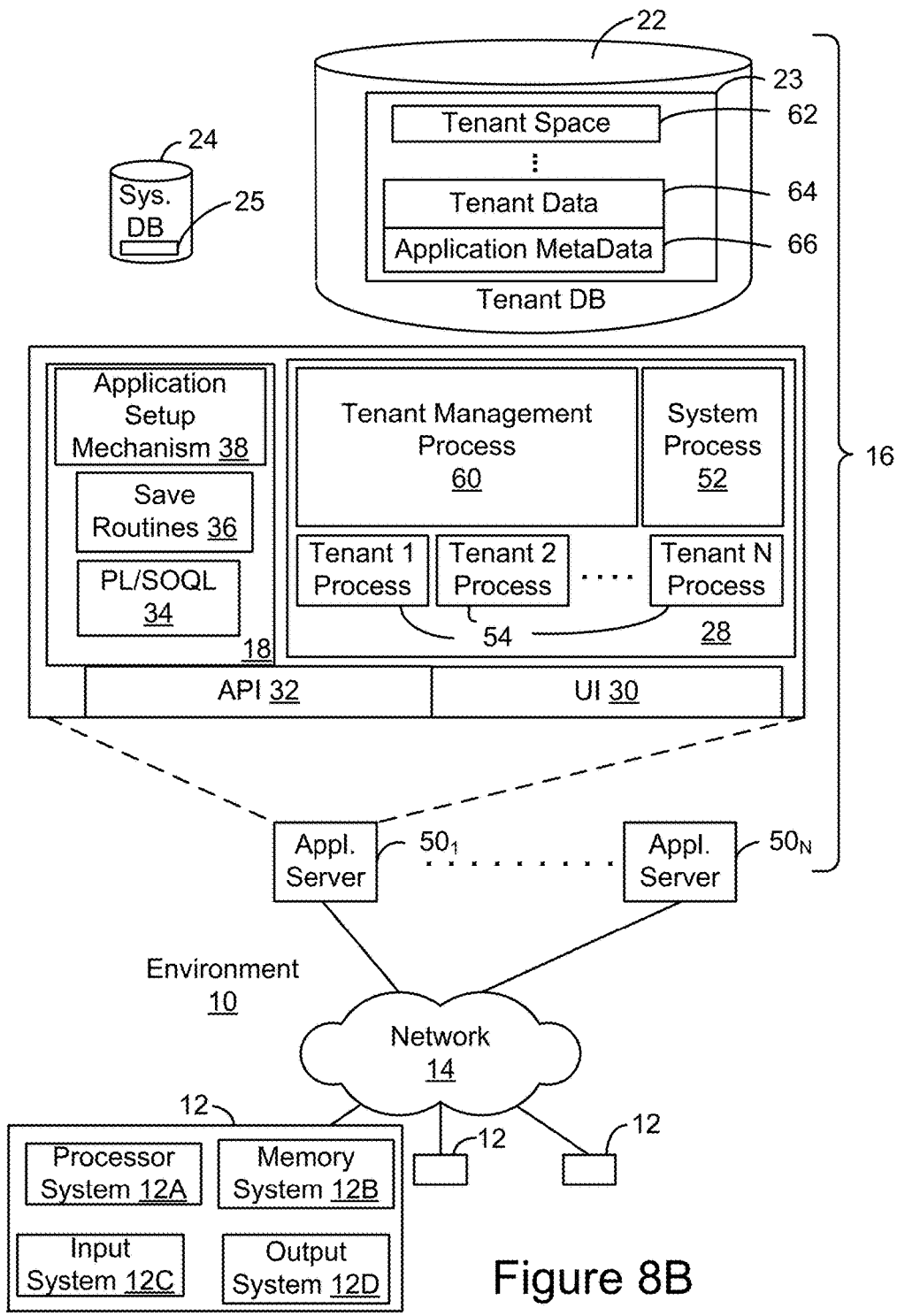
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
during execution of a web-based application, providing a graphical user interface (GUI) for display at a client device in association with a web site, the GUI including a history component associated with a user of the client device and with the application, the history component including a hierarchical structure identifying a set of primary tabs recently accessed by the user during execution of the web-based application and identifying a set of sub-tabs recently accessed by the user during execution of the web-based application, each sub-tab of the set of sub-tabs being identified within the hierarchical structure in association with a corresponding primary tab of the set of primary tabs, each primary tab of the set of primary tabs and each sub-tab of the set of sub-tabs being associated with a corresponding one or more data objects stored in at least one database;
processing an indication of a user selection, via a utility bar of the GUI, of one of a plurality of primary tabs displayable in the utility bar of the GUI, the utility bar being independent from the history component, each primary tab of the plurality of primary tabs and each sub-tab of the plurality of primary tabs being associated with a corresponding one or more data objects stored in the at least one database;
responsive to processing the indication of the user selection, providing information pertaining to one or more data objects associated with the selected primary tab using a link, the selected primary tab having an associated one or more selectable sub-tabs, the link including an identifier of the selected primary tab and an identifier of each of the associated one or more selectable sub-tabs of the selected primary tab, the link indicating a hierarchy of the selected primary tab and the associated one or more selectable sub-tabs; and
updating the history component of the GUI such that only a single instance of the selected primary tab is included in the set of primary tabs, and an indicator of how recent the selected primary tab was accessed, in relation to other primary tabs identified in the set of primary tabs, is provided.

2. The system of claim 1, the database system further configurable to cause:
generating the link; and storing, in the at least one database, information associating the link with the one of the plurality of primary tabs.

3. The system of claim 1, the database system further configurable to cause:
processing an indication that the user has requested that the link be added to a virtual clipboard;
responsive to processing the indication that the user has requested that the link be added to a virtual clipboard, generating or updating a virtual clipboard to include the link; and
providing the virtual clipboard for display at the client device.

4. The system of claim 1, the database system further configurable to cause:
listening to tab events during the execution of the web-based application in association with the user;
detecting a tab event during execution of the web-based application;
broadcasting the tab event to one or more components configured to update the GUI.

5. The system of claim 4, wherein the tab event is a closure of a primary tab, closure of a sub-tab, selection of a primary tab, or selection of a sub-tab.

6. The system of claim 1, wherein the set of primary tabs are listed in the history component in an order indicating recency of access by the user during execution of the web-based application.

7. The system of claim 1, wherein sub-tabs associated with a particular primary tab of the set of primary tabs are listed in a sequential order based, at least on part, on at least one of: recency of access by the user during execution of the web-based application, numerical order, alphabetical order, or alphanumeric order.

8. A computer program product comprising computer-readable program code capable of being executed by one or more processors when retrieved from a non-transitory computer-readable medium, the program code comprising instructions configurable to cause:
during execution of a web-based application, providing a graphical user interface (GUI) for display at a client device in association with a web site, the GUI including a history component associated with a user of the client device and with the application, the history component including a hierarchical structure identifying a set of primary tabs recently accessed by the user during execution of the web-based application and identifying a set of sub-tabs recently accessed by the user during execution of the web-based application, each sub-tab of the set of sub-tabs being identified within the hierarchical structure in association with a corresponding primary tab of the set of primary tabs, each primary tab of the set of primary tabs and each sub-tab of the set of sub-tabs being associated with a corresponding one or more data objects stored in at least one database;
processing an indication of a user selection, via a utility bar of the GUI, of one of a plurality of primary tabs displayable in the utility bar of the GUI, the utility bar being independent from the history component, each primary tab of the plurality of primary tabs and each sub-tab of the plurality of primary tabs being associated with a corresponding one or more data objects stored in the at least one database;
responsive to processing the indication of the user selection, providing information pertaining to one or more data objects associated with the selected primary tab using a link, the selected primary tab having an associated one or more selectable sub-tabs, the link including an identifier of the selected primary tab and an identifier of each of the associated one or more selectable sub-tabs of the selected primary tab, the link indicating a hierarchy of the selected primary tab and the associated one or more selectable sub-tabs; and
updating the history component of the GUI such that only a single instance of the selected primary tab is included in the set of primary tabs, and an indicator of how recent the selected primary tab was accessed, in relation to other primary tabs identified in the set of primary tabs, is provided.

9. The computer program product of claim 8, the program code further comprising instructions configurable to cause:
generating the link; and
storing, in the at least one database, information associating the link with the one of the plurality of primary tabs.

10. The computer program product of claim 8, the program code further comprising instructions configurable to cause:
processing an indication that the user has requested that the link be added to a virtual clipboard;
responsive to processing the indication that the user has requested that the link be added to a virtual clipboard, generating or updating a virtual clipboard to include the link; and
providing the virtual clipboard for display at the client device.

11. The computer program product of claim 8, the program code further comprising instructions configurable to cause:
listening to tab events during the execution of the web-based application in association with the user;
detecting a tab event during execution of the web-based application;
broadcasting the tab event to one or more components configured to update the GUI.

12. The computer program product of claim 11, wherein the tab event is a closure of a primary tab, closure of a sub-tab, selection of a primary tab, or selection of a sub-tab.

13. The computer program product of claim 8, wherein the set of primary tabs are listed in the history component in an order indicating recency of access by the user during execution of the web-based application.

14. A method, comprising:
during execution of a web-based application, providing a graphical user interface (GUI) for display at a client device in association with a web site, the GUI including a history component associated with a user of the client device and with the application, the history component including a hierarchical structure identifying a set of primary tabs recently accessed by the user during execution of the web-based application and identifying a set of sub-tabs recently accessed by the user during execution of the web-based application, each sub-tab of the set of sub-tabs being identified within the hierarchical structure in association with a corresponding primary tab of the set of primary tabs, each primary tab of the set of primary tabs and each sub-tab of the set of sub-tabs being associated with a corresponding one or more data objects stored in at least one database;
processing an indication of a user selection, via a utility bar of the GUI, of one of a plurality of primary tabs displayable in the utility bar of the GUI, the utility bar being independent from the history component, each primary tab of the plurality of primary tabs and each sub-tab of the plurality of primary tabs being associated with a corresponding one or more data objects stored in the at least one database;

responsive to processing the indication of the user selection, providing information pertaining to one or more data objects associated with the selected primary tab using a link, the selected primary tab having an associated one or more selectable sub-tabs, the link including an identifier of the selected primary tab and an identifier of each of the associated one or more selectable sub-tabs of the selected primary tab, the link indicating a hierarchy of the selected primary tab and the associated one or more selectable sub-tabs; and updating the history component of the GUI such that only a single instance of the selected primary tab is included in the set of primary tabs, and an indicator of how recent the selected primary tab was accessed, in relation to other primary tabs identified in the set of primary tabs, is provided.

15. The method of claim 14, further comprising:
generating the link; and
storing, in the at least one database, information associating the link with the one of the plurality of primary tabs.

16. The method of claim 14, further comprising:
receiving an indication that the user has requested that the link be added to a virtual clipboard;
responsive to receiving the indication that the user has requested that the link be added to a virtual clipboard, generating or updating a virtual clipboard to include the link; and providing the virtual clipboard for display at the client device.

17. The method of claim 14, further comprising:
listening to tab events during the execution of the web-based application in association with the user;
detecting a tab event during execution of the web-based application;
broadcasting the tab event to one or more components configured to update the GUI.

18. The method of claim 17, wherein the tab event is a closure of a primary tab, closure of a sub-tab, selection of a primary tab, or selection of a sub-tab.

19. The method of claim 14, wherein the set of primary tabs are listed in the history component in an order indicating recency of access by the user during execution of the web-based application.

20. The method of claim 14, wherein sub-tabs associated with a particular primary tab of the set of primary tabs are listed in a sequential order based, at least on part, on at least one of: recency of access by the user during execution of the web-based application, numerical order, alphabetical order, or alphanumeric order.

21. The system of claim 1, the database system configurable to cause:
sharing the link with a second user.

22. The system of claim 1, each of the data objects being a database record of the database.

* * * * *